(12) United States Patent
Sekine

(10) Patent No.: US 7,483,052 B2
(45) Date of Patent: Jan. 27, 2009

(54) IMAGE-CAPTURING APPARATUS, IMAGE PROCESSING SYSTEM, CONTROL METHOD, AND STORAGE MEDIUM FOR USE WITH EXTERNAL PRINTER WITH DETERMINATION OF OPERATING STATE OF EXTERNAL PRINTER AND CORRESPONDING ADJUSTMENT OF CLOCK SIGNAL

(75) Inventor: Masayoshi Sekine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 11/152,059

(22) Filed: Jun. 15, 2005

(65) Prior Publication Data

US 2005/0231597 A1 Oct. 20, 2005

Related U.S. Application Data

(62) Division of application No. 10/023,756, filed on Dec. 21, 2001, now Pat. No. 6,952,222.

(30) Foreign Application Priority Data

Dec. 21, 2000 (JP) ............................. 2000-389447

(51) Int. Cl.
H04N 5/225 (2006.01)

(52) U.S. Cl. .................................... 348/207.2; 348/372

(58) Field of Classification Search ............. 348/207.2, 348/333.13, 372, 537, 312, 536, 220.1; 358/486, 358/412, 906
See application file for complete search history.

(56) References Cited

U.S. PATENT DOCUMENTS

| | | | |
|---|---|---|---|
| 4,837,628 A | 6/1989 | Sasaki | 348/220.1 |
| 5,206,730 A | 4/1993 | Sakai | 348/220.1 |
| 5,493,409 A | 2/1996 | Maeda et al. | 358/296 |
| 5,539,455 A | 7/1996 | Makioka | 348/222.1 |
| 5,786,847 A | 7/1998 | Katayama et al. | 348/47 |
| 5,825,511 A | 10/1998 | Hori et al. | 358/486 |
| 5,907,434 A | 5/1999 | Sekine et al. | 359/462 |
| 6,111,605 A | 8/2000 | Suzuki | 348/220.1 |

(Continued)

FOREIGN PATENT DOCUMENTS

EP 0 881 817 A2 5/1998

(Continued)

OTHER PUBLICATIONS

English Machine Translation of JP 10-243327 A (JP publihcation on Sep. 11, 1998).*

*Primary Examiner*—Lin Ye
*Assistant Examiner*—Nelson D Hernández Hernández
(74) *Attorney, Agent, or Firm*—Fitzpatrick, Cella, Harper & Scinto

(57) ABSTRACT

An image-capturing apparatus has a function for printing an image with the use of an external printer. The image-capturing apparatus includes an image-capturing section, a control section, and a clock generating section. The control section controls the operation of the entire image-capturing apparatus, including the image-capturing section (hardware), and executes printing processing for printing an image by the external printer. The clock generating section generates a higher operating frequency when the control section executes printing processing (i.e., in a printing mode) than when the image-capturing section obtains an image (i.e., in an image-capturing mode), for the control section.

16 Claims, 4 Drawing Sheets

U.S. PATENT DOCUMENTS

| | | | |
|---|---|---|---|
| 6,580,460 B1 * | 6/2003 | Takahashi et al. | 348/372 |
| 6,618,553 B1 | 9/2003 | Shiohara | 386/117 |
| 6,687,020 B1 | 2/2004 | Hanagami et al. | 358/296 |
| 6,771,896 B2 * | 8/2004 | Tamura et al. | 396/57 |
| 6,952,222 B2 * | 10/2005 | Sekine | 348/207.2 |
| 2002/0054238 A1 | 5/2002 | Kunio | 348/537 |

FOREIGN PATENT DOCUMENTS

| | | | |
|---|---|---|---|
| JP | 10243327 A * | 9/1998 | |
| JP | 11-46331 | 2/1999 | |

* cited by examiner

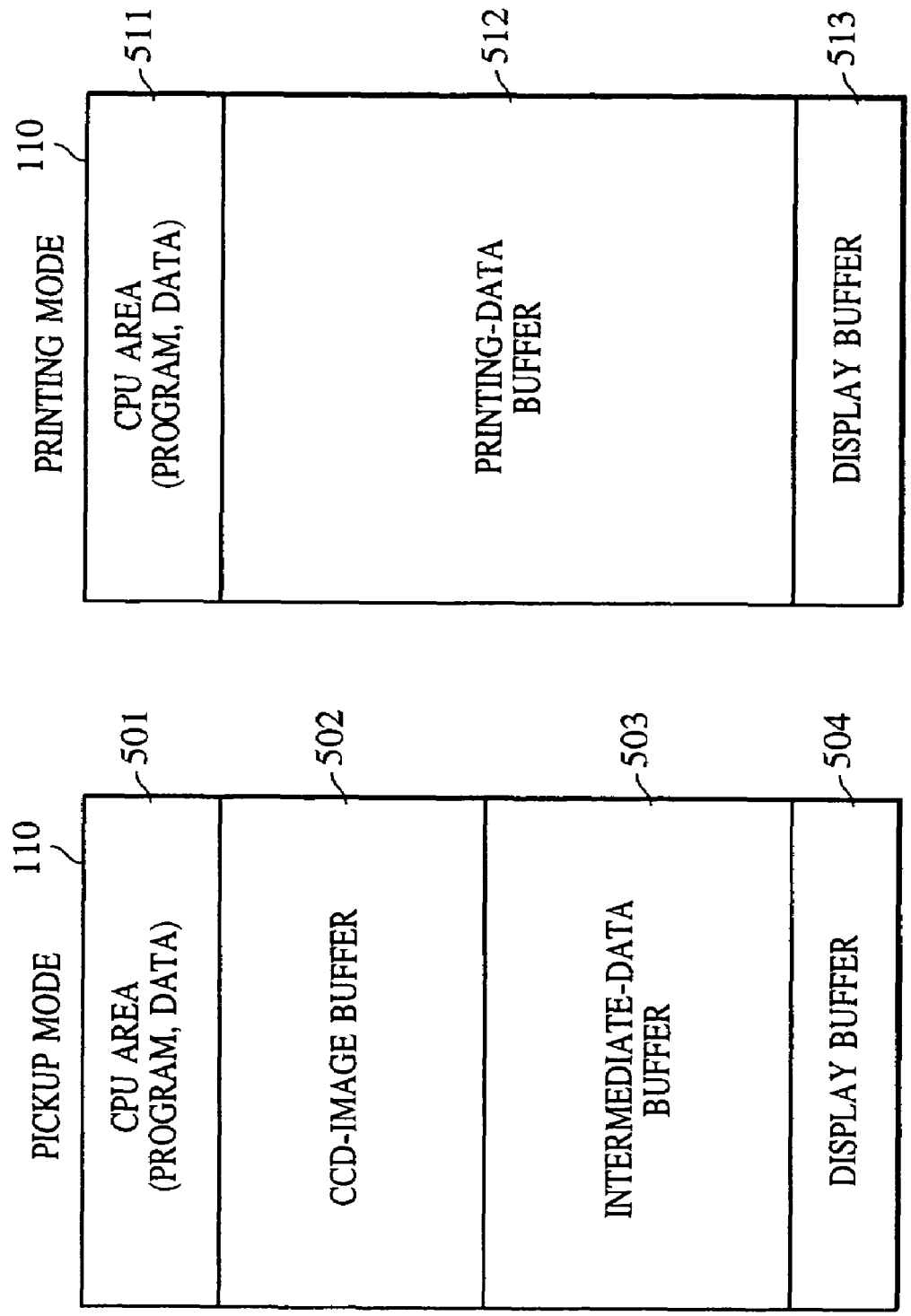

IMAGE-CAPTURING APPARATUS, IMAGE PROCESSING SYSTEM, CONTROL METHOD, AND STORAGE MEDIUM FOR USE WITH EXTERNAL PRINTER WITH DETERMINATION OF OPERATING STATE OF EXTERNAL PRINTER AND CORRESPONDING ADJUSTMENT OF CLOCK SIGNAL

This application is a division of application Ser. No. 10/023,756, filed Dec. 21, 2001.

BACKGROUND OF THE INVENTION

1. Field of the Invention

The present invention relates to image-capturing apparatuses, image processing systems, control methods, and storage media storing computer-readable processing steps for implementing the methods, all of which are used for digital cameras connectable through communication means such as a USB to personal computers and to printers.

2. Description of the Related Art

As image-pickup devices such as CCDs have had a large number of pixels, digital cameras can include image-pickup devices having two million pixels to three million pixels these days.

Images taken by such digital cameras (hereinafter called just "digital cameras") having a large number of pixels can be enjoyed on a screen of a personal computer (hereinafter called a "PC") or can be put on web sites. There is also a high demand for printing them by means of a printer and enjoying them as printed photographs.

Since images taken by a digital camera are written in a memory built in the digital camera or in a storage medium, such as a non-volatile memory card, detachable from the digital camera, however, it is necessary, for example, that the images written into the storage medium be sent to a PC through communication means, such as a USB or a serial bus (RS-232C), processed for printing by the PC, and printed by a printer, in order to print the images.

Alternatively, when taken images have been written into a non-volatile memory card, it is necessary that the non-volatile memory card be directly connected to a PC, and that the taken images written into the non-volatile memory card be sent to the PC and printed.

The above-described work for printing taken images is very troublesome, very complicated, and time consuming for users, and taken images may be lost due to an erroneous operation.

In addition, when the user wants to print an image stored in a digital camera, at a place where the user is now located, it is impossible to enlarge, print, and enjoy the image without a PC at the place.

To solve the foregoing problems, a digital camera has been proposed, for example, in Japanese Patent Laid-Open No. Hei-11-046331, which has a camera-printing-control function to implement so-called direct printing, which means that taken images are printed without a PC.

More specifically, the digital camera such as that described in Japanese Patent Laid-Open No. Hei-11-046331 has a function for outputting taken-image data from itself to an external apparatus as well as a function (printing function) for printing a desired taken image with a desired printing specification (such as the number of prints, a printing size, and a printing color).

As one of their most important characteristics, digital cameras need to be portable. Therefore, they should be compact and lightweight as the top priority.

Also, it is, of course, always demanded that digital cameras have low prices, have good responses when capturing images, and allow high-speed image capturing.

Due to the structures of the digital cameras, such as that described in Japanese Patent Laid-Open No. Hei-11-046331, they have the following problems (1) to (3) when they have a printing function:

(1) When digital cameras having a large number of pixels have a printing function, a very large amount of taken-image data (printing data) needs to be sent to a printer. Especially when serial communication means such as RS-232C is used for sending the printing data, it takes a very long time to send it.

When a parallel port provided for printers in many cases is used, digital cameras need to have a connector having a large number of pins, making the cameras larger or increasing their price.

(2) To execute printing processing in the digital cameras, it is necessary that the digital cameras have a high-speed CPU.

Because a high-speed CPU generally consumes a large amount of electric power while digital cameras are provided with a battery having a small capacity, however, when a high-speed CPU is provided for digital cameras, the battery is consumed earlier due to high power consumption.

In addition, since digital cameras have a small body, when a high-speed CPU is provided for a digital camera, more heat is generated, the surface temperature of the body rises, and the user feels hot when the user touches the camera body.

(3) To execute printing processing by a CPU in the digital cameras, it is generally required that a taken image to be printed is developed for each ink color. Therefore, the CPU needs a large memory capacity, and the number of memory chips to be mounted on the digital cameras is increased. The manufacturing cost of the digital cameras is thereby increased.

SUMMARY OF THE INVENTION

The present invention has been made in order to solve one or more of the foregoing problems.

It is an object of the present invention to reduce electric-power consumption by performing an image-capturing operation and printing control at an appropriate operating frequency according to an operation mode.

The foregoing object is achieved in one aspect of the present invention through the provision of an image-capturing apparatus having a function for printing a captured image with the use of an external printing function. In this arrangement, image-capturing means obtain the captured image, and control means control the operation of the entire apparatus, including at least the image-capturing means, and execute printing processing for printing the captured image. Clock generating means generate a clock having an operating frequency for the image-capturing means and the control means. The clock generating means generate clocks having different operating frequencies for the control means between when the printing processing is executed and when the image-capturing means obtain an image.

Another object of the present invention is to allow operation control in a printing mode to be finished in a short period.

The foregoing object is achieved in another aspect of the present invention through the provision of an image-capturing apparatus directly connectable to a printer and operating at least either an image-capturing mode or a printing mode, including control means for controlling the operation of the entire apparatus, and clock generating means for giving the control means a clock having a higher operating frequency than an operating frequency used in the image-capturing mode, in the printing mode.

One of the foregoing objects is achieved in still another aspect of the present invention through the provision of a printer system including a printer, and an image-capturing apparatus directly connectable to the printer and operating at least either an image-capturing mode or a printing mode. In this aspect, control means control the operation of the entire apparatus, and clock generating means give the control means a clock having a higher operating frequency than an operating frequency used in the image-capturing mode, in the printing mode.

One of the foregoing objects is achieved in yet another aspect of the present invention through the provision of a control method for an image-capturing apparatus having at least an image-capturing mode for obtaining an image and a printing mode for printing the obtained image by a printer externally connected. This method includes a mode switching step, of switching between the image-capturing mode and the printing mode, and a frequency switching step, of switching the operating frequency of the image-capturing apparatus according to mode switching made in the mode switching step.

One of the foregoing objects is achieved in still yet another aspect of the present invention through the provision of a storage medium storing a computer-readable program for executing a control method, the control method including a mode switching step, of switching between the image-capturing mode and the printing mode, and a frequency switching step, of switching the operating frequency of the image-capturing apparatus according to mode switching made in the mode switching step.

One of the foregoing objects is achieved in a further aspect of the present invention through the provision of an image-capturing apparatus having a plurality of operation modes, including control means for controlling the operation of the entire image-capturing apparatus, and frequency changing means for changing the operating frequency of the control means according to an operation mode.

One of the foregoing objects is achieved in a still further aspect of the present invention through the provision of a control method for an image-capturing apparatus having a plurality of operation modes, including an operation-mode changing step, and a frequency changing step, of changing an operating frequency used for control of the image-capturing apparatus according to an operation-mode change.

Further objects, features and advantages of the present invention will become apparent from the following description of the preferred embodiments with reference to the attached drawings.

BRIEF DESCRIPTION OF THE DRAWINGS

FIG. 4, consisting of FIGS. 4A and 4B, shows memory structures in the digital camera.

DESCRIPTION OF THE PREFERRED EMBODIMENTS

Figure 1:
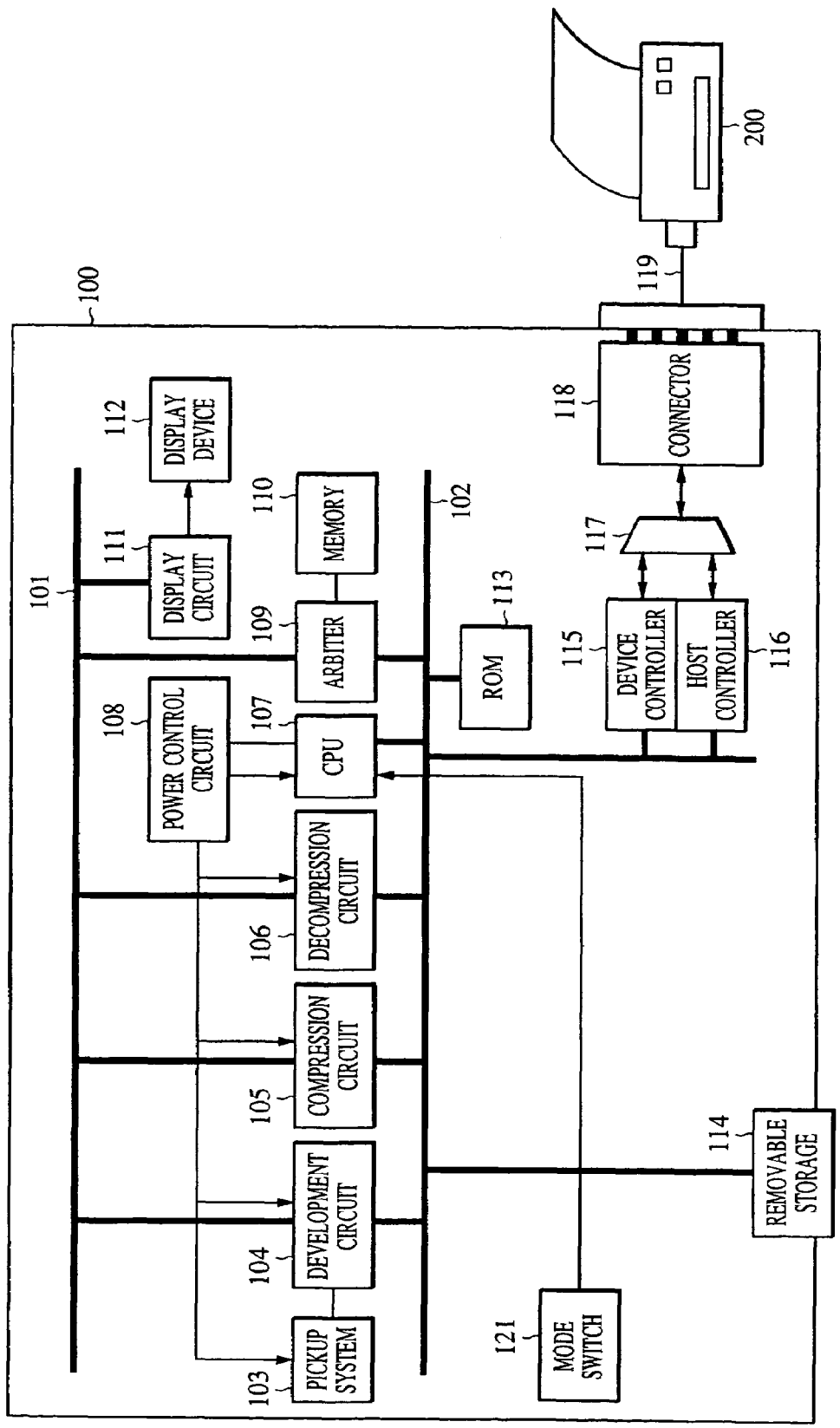
FIG. 1 is a block diagram of a digital camera according to a preferred embodiment of the present invention.

An embodiment of the present invention will be described below by referring to the drawings.

A case in which the present invention is applied to a digital camera 100 shown in FIG. 1 will be described.

In FIG. 1, the digital camera 100 includes a pickup system 103; a development circuit 104 having a function for performing various types of image processing to convert information obtained by image capturing to data which can be controlled by the camera, for performing development processing, such as gamma processing, color processing, luminance processing, and edge enhancement on a signal output from the pickup system 103; an image compression circuit 105 for performing compression such as JPEG; an image decompression circuit 106 for performing decompression; a CPU 107 for controlling the operation of the entire digital camera 100; an electric-power control circuit 108; a DRAM memory 110 (hereinafter just called a memory); an arbiter 109 for arbitrating the memory use right of the memory 110; a ROM 113; a detachable storage memory 114, such as a compact flash; controllers 115 and 116 for communications; a CPU system bus 102; a selector 117 for choosing one of the two communication controllers 115 and 116; a communication connector 118; a display circuit 111; an LCD display device 112; an image-system bus 101; and an operation switch (mode switch) 121 for the user to specify an operation mode for the entire digital camera 100.

The pickup system 103 includes a pickup lens, an aperture, a focus control section, a zooming control section, and others although all of them are not shown.

The CPU 107 performs, for example, operation control of the entire digital camera 100, memory control of the memory 110, and operation control of the electric-power control circuit 108, through the CPU system bus 102.

The memory 110 is connected to both the CPU system bus 102 and the image system bus 101 through the arbiter 109 such that the memory 110 is shared by the two buses for cost reduction.

The ROM 113, the storage memory 114, and the communication controllers 115 and 116 are connected to the CPU system bus 102.

The communication controllers 115 and 116 are expected to be controllers having a host function and a slave function separately, as in the USB.

The communication connector 118 is connected to one end of a communication cable 119, and the communication cable 119 can be connected to a printer 200 at the other end.

The display circuit 111 displays an electronic finder or a reproduced image on the LCD display device 112, and is connected to the image system bus 101.

A temporary image area used for displaying an image in the display circuit 111 is provided for the memory 110, and is structured such that stable reading of the data of an image to be displayed continues.

As shown in FIG. 1, the digital camera 100 according to the present invention is structured such that all portions related to basic image-capturing functions (functions such as development, compression, and decompression) are implemented by special circuits (such as the development circuit 104, the image compression circuit 105, and the image decompression circuit 106), and these circuits operate at high speeds with low power consumption.

The reasons why all of the portions related to the basic image-capturing functions are implemented by the special circuits are described below. When a CPU performs development, compression, decompression, and others, more than necessary circuit operations are performed. When a CPU manufactured by the same semiconductor manufacturing technology as the CPU 107 according to the present embodiment executes development, compression, decompression, and others, for example, it is known that current consumption and processing time need to be several times to several tens of times those required in the structure of the present embodiment.

The pickup system 103 is not detached from the digital camera 100. Once the most appropriate algorithm is determined for the model of the digital camera 100, the algorithm does not need to be changed.

Therefore, to implement the compact, lightweight digital camera 100 which allows high-speed, consecutive, smooth image capturing with the use of a limited capacity of a battery, the development circuit 104, the image compression circuit 105, and the image decompression circuit 106 are structured by hardware.

With the above-described structure, the CPU 107 needs to perform monitoring of a power source for the entire digital camera 100; monitoring of switches; monitoring of the progress of processing conducted by the development circuit 104, the image compression circuit 105, and the image decompression circuit 106; file management, and others, and it does not need to have a large processing capability.

In the digital camera 100, a clock frequency is reduced and a hold mode (mode in which the operation of the CPU 107 is stopped to reduce power consumption) is actively used so as not to use electric power more than necessary.

This is because, as a clock frequency increases, the current consumption of a semiconductor device manufactured by a CMOS technology is generally increased in proportion to the clock frequency; and as the clock frequency increases, the processing capability of the CPU 107 is improved except that of a part of interfaces.

It is preferred, however, that the CPU 107 perform image processing for printing at the printer 200 connected to the connector 118, and its operation control. This is because the digital camera 100 can be externally connected to at least a plurality of models of printers.

More specifically, for example, the user uses a compact, battery-driven printer as the printer 200 connected to the digital camera 100 at a place where the user goes, and the user uses a high-image-quality, high-speed printer as the printer 200 connected to the digital camera 100 on the desk of the user. Various uses can be considered.

It can also be considered that, as technologies have advanced, the type of ink or a color separation method may differ depending on the manufacturing period of the model of the printer 200.

Therefore, because image processing for printing at the printer 200 and its operation control (hereinafter just called "printing processing") differ largely depending on the models of printers to be connected, it is difficult to perform the printing processing by means of dedicated or specially designed hardware. It is preferred that the CPU 107 perform it.

Since the printing processing needs to handle a large amount of information, and to perform complicated matrix calculations, and, depending on the model of the printer 200, binary processing, use of a low-speed CPU as the CPU 107 to execute such printing processing results in long processing times.

Therefore, even when development processing, image compression processing and image decompression processing are performed by hardware, that is, the development circuit 104, the image compression circuit 105, and the image decompression circuit 106, the printing processing needs to be performed at a high speed by the CPU 107.

In addition, when the display circuit 111 and the display device 112 always consume electric power, as in the back-lighting of a liquid-crystal display device, it is necessary to finish printing processing as soon as possible and to delete information displayed by the display circuit 111 and the display device 112 immediately when the printing processing is finished. Compared with such a structure, when the processing capability of the CPU 107 is increased and the CPU 107 performs printing processing, battery consumption may be suppressed still further. Furthermore, the digital camera can return to an image-capturing ready state earlier.

Figure 2:
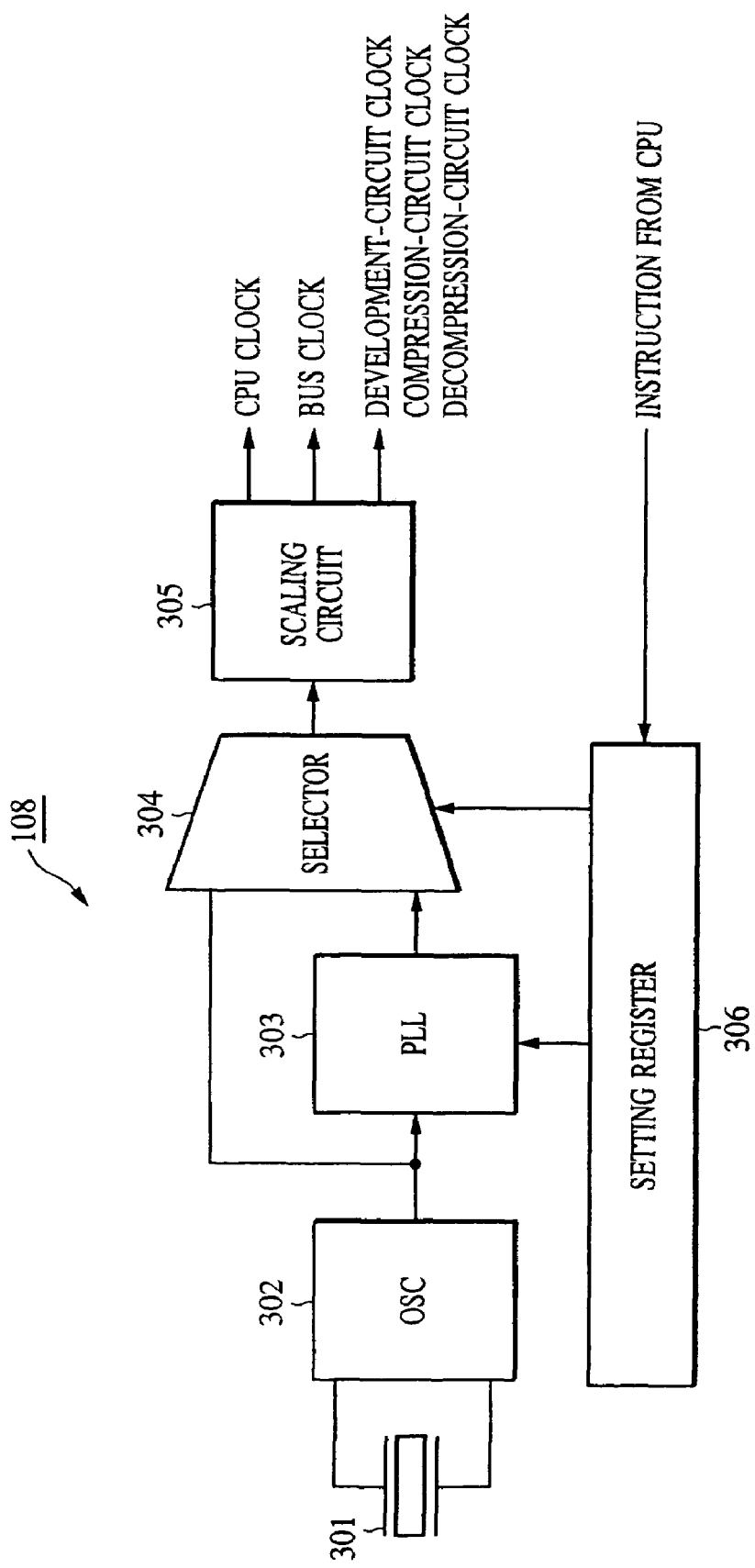
FIG. 2 is a block diagram of an electric-power control circuit in the digital camera of FIG. 1.

In the present embodiment, the electric-power control circuit 108 is structured as shown in FIG. 2. The electric-power control circuit 108 sends operation clocks to various control means.

The electric-power control circuit 108 includes a crystal oscillator 301, an oscillator (OSC) 302, a PLL circuit 303, a selector 304, a scaling circuit 305, and a setting register 306, as shown in FIG. 2.

When the PLL circuit 303 is a high-speed PLL circuit, for example, a high current consumption is generally required. When the PLL circuit 303 does not need a higher frequency than the oscillating frequency of the crystal oscillator 301, the operation of the PLL circuit 303 can be stopped to suppress the current consumption of the entire digital camera 100.

In this case, the output of the selector 304 is not the output of the PLL circuit 303 but the output of the oscillator 302.

The scaling circuit 305 scales down the output signal of the selector 304 to signals having half, one fourth, one eighth, and so on the frequency of the output signal.

The PLL circuit 303, the selector 304, and the scaling circuit 305 are controlled by data stored in the setting register 306 by a control instruction (command) of the CPU 107.

The setting register 306 stores control data used for modifying various clocks output from the scaling circuit 305 to clocks suited to an operation mode, described later.

As described above, clocks having controlled clock frequencies generated by the scaling circuit 305 are sent to the CPU 107 and to the buses 101 and 102 to control the current consumption of the entire digital camera 100 and its processing capability.

The CPU 107 specifies the following control data in the setting register 306 according to an operation mode specified by the mode switch 121.

The user operates the mode switch 121 on an operation panel to select a desired operation mode from among an image-capturing mode, a reproduction mode, a communication mode, and a printing mode.

When the image-capturing mode, the reproduction mode, or the communication mode is selected at the mode switch 121, since all of the portions related to the basic image-capturing functions are implemented by special circuits (by hardware with the development circuit 104, the image compression circuit 105, and the image decompression circuit 106), none of the above three operation modes needs a high processing capability of the CPU 107.

Therefore, control data which sets the frequency of a CPU clock to half the highest frequency or less is specified in the setting register 306. When the highest operating frequency of the CPU 107 is 100 MHz, for example, it is sufficient to set the frequency to 25 MHz or 50 MHz in any of the above operation modes.

When the printing-mode is selected at the mode switch 121, control data which sets the frequency of the CPU clock to the highest frequency is specified in the setting register 306. With this setting, the CPU 107 has the highest processing capability and starts performing the printing processing at a high speed.

In the printing mode, the following operation is also possible.

Assuming that image capturing is not performed during the printing mode, control data which stops sending clocks to the pickup system 103, the development circuit 104, and the image compression circuit 105 is specified in the setting register 306.

To print out a compressed image file written in the storage, a clock is continued to be sent to the image decompression circuit 106. The current consumption of the entire digital camera 100 is suppressed to a low level during the printing processing.

Figure 3:
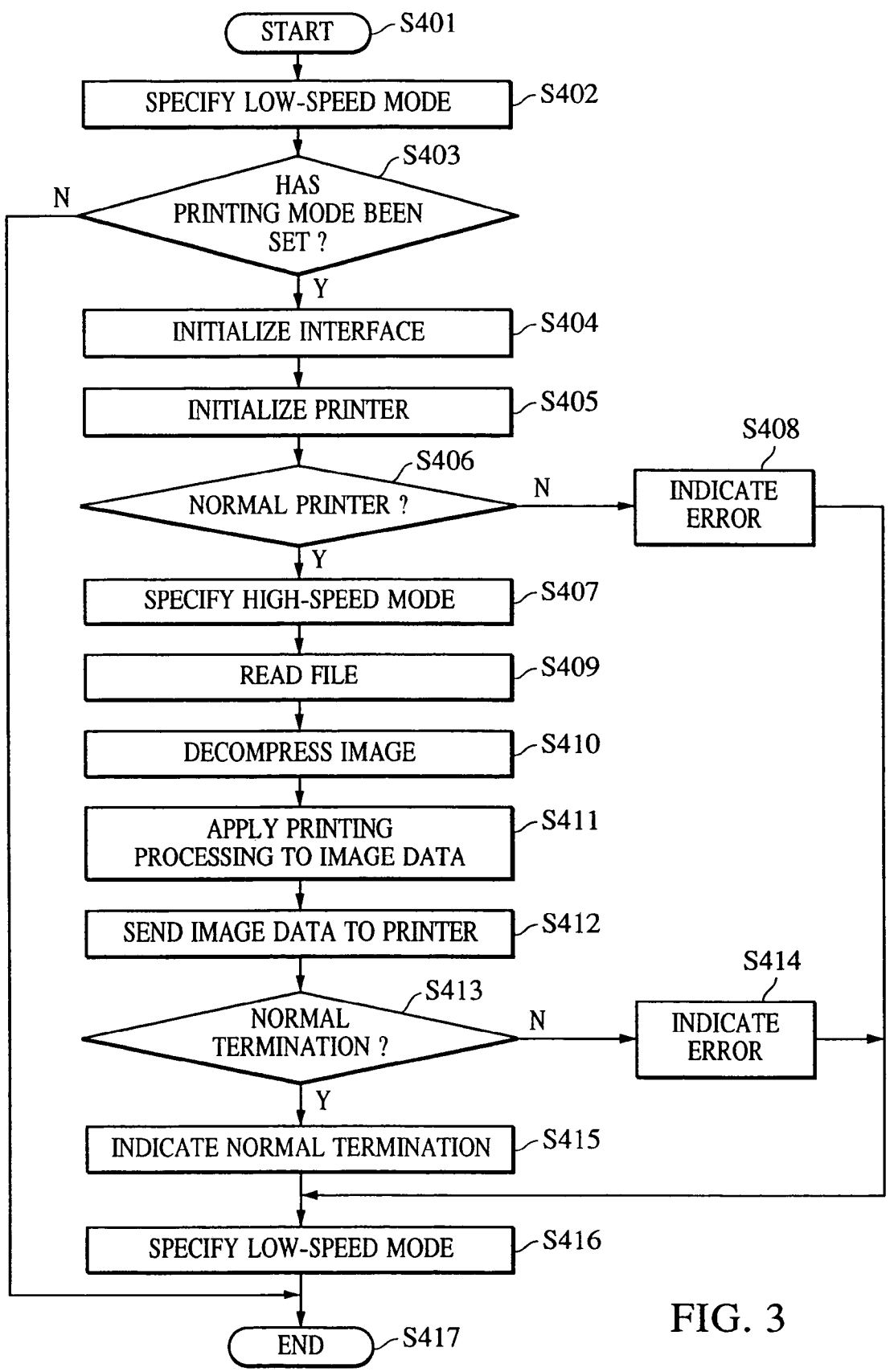
FIG. 3 is a flowchart of the operation of the digital camera of FIG. 1.

FIG. 3 shows an example operation of the digital camera 100.

In other words, when the CPU 107 executes a processing program based on a flowchart shown in FIG. 3, the digital camera 110 operates in the following way.

When the present operation processing is started in step S401, the CPU 107 first changes the operation mode of the digital camera 100 to a low-speed mode in step S402. When the operation mode has been the low-speed mode, the process of step S402 does not need to be executed.

The low-speed mode is, as described above, when the CPU 107 is a CPU having the highest operating frequency of 100 MHz, an operation mode in which the CPU 107 operates at a frequency of about 25 MHz or 50 MHz.

Then, the CPU 107 determines whether the user specifies the printing mode at the mode switch 121, in step S403.

As a result of determination, when the printing mode is not specified, the present operation processing is finished in step S417.

As a result of determination performed in step S403, when the printing mode has been specified, the CPU 107 executes interface initialization processing in step S404, and the initialization processing of the printer 200 in step S405.

Next, the CPU 107 determines whether the printer 200 is an expected printer and whether it is in a normal state, in a step S406.

As a result of determination, when an erroneous case occurs, for example, when the printer 200 is an unexpected printer for which printer driver software is not mounted, when the printer 200 is not turned on, when the printer 200 has no ink, or when the printer 200 has no printing paper, the CPU 107 indicates an error by the display circuit 111 and the display device 112 in step S408, and then, the processing proceeds to step S416.

When the printer 200 is in a normal state as a result of determination performed in step S406, the CPU 107 controls the electric-power control circuit 108 so as to generate a clock having a higher clock frequency (such as 100 MHz) as the clock (CPU clock) to the CPU 107, in step S407.

The reason why it is determined in step S406 whether the printer 200 is in a normal state is that, if the printer 200 is not in a normal state, the clock frequency is prevented from being uselessly increased so as not to draw more electric power than necessary.

Next, the CPU 107 reads an image file to be printed, from the storage 114 in step S409, decompresses it in the image decompression circuit 106 in step S410, and applies printing processing to the image data decompressed, in step S411. Then, the CPU 107 sends the image data to which the printing processing has been applied, to the printer 200 through the communication controllers 115 and 116, in step S412.

Then, the CPU 107 communicates with the printer 200 through the communication controllers 115 and 116 to determine whether transmission processing of image data to the printer 200 and the printing processing in the printer 200 performed thereafter have been successfully terminated, in step S413. As a result of this determination, if the processing has not been successfully finished, the CPU 107 indicates an error by the display circuit 111 and the display device 112 in step S414. Then, the processing proceeds to step S416.

As a result of determination performed in step S413, transmission processing of image data to the printer 200 and the printing processing in the printer 200 performed thereafter have been successfully terminated, The CPU 107 indicates normal termination by the display circuit 111 and the display device 112 in step S415. Then, the processing proceeds to the next step, S416.

In step S416, the CPU 107 changes the operation mode of the digital camera 100 to the low-speed mode in the same way as in the process of step S402.

Then, the present operation processing is finished, in step S417.

As shown in FIG. 3, in the digital camera 100, when it is determined that the user specifies the printing mode, it is determined whether the printer 200 is in a normal state. When the printer 200 is in a normal state, the operation mode of the digital camera 100 is changed to the high-speed mode, and printing processing is executed at a high speed.

With these operations, the digital camera 100 operates in the high-speed mode only for the shortest period required for the printing processing, and wasteful use of electric power is prevented.

As described above, in the digital camera 100 according to the present embodiment, processing such as image capturing and image compression is executed by hardware at high speeds to suppress electric power required for processing in the CPU 107; and when an image is directly printed from the digital camera 100, the operation mode of the CPU 107 is changed to the high-speed mode, and the CPU 107 executes the printing processing within a short period.

With these operations, the power consumption of the entire digital camera 100 is suppressed, and the printing processing is executed within a short period.

In the above embodiment, the mode is switched by an operation at the switch 121. Therefore, the clock speed inside the camera can be changed according to a desired user operation to prevent electric power from being excessively consumed.

It may be also possible that the operation mode is automatically switched to the printing mode not when the switch 121 is operated but when the camera 100 is connected to the printer 200, and the clock is also changed to a higher clock than that used in an image-capturing ready state (image-capturing mode). In this case, the user does not need to pay attention to a mode switching operation.

In the digital camera 100 shown in FIG. 1, the memory 110 is configured as described below.

FIG. 4A shows the structure of the memory 110 in the image-capturing mode, and FIG. 4B shows the structure of the memory 110 in the printing mode.

In the image-capturing mode, as shown in FIG. 4A, the memory 110 includes a CPU area 501, a CCD image buffer 502, an intermediate-data buffer 503, and a display buffer 504.

The CPU area 501 stores a processing program, a stack, and data to be used by the CPU 107.

The CCD image buffer 502 sequentially stores signals (signals output from the CCD) taken from the pickup system 103. Since the output of a CCD generally needs to be sequentially stored in a large buffer area prepared in advance, this CCD image buffer 502 is provided.

The intermediate-data buffer 503 stores intermediate data generated during the execution of the processing performed in the development circuit 104, the image compression-circuit 105, and the image decompression circuit 106. When the image compression circuit 105 finishes JPEG compression processing, for example, the intermediate-data buffer 503 stores JPEG-file image data. Then, the CPU 107 attaches a file header and others to the image data stored in the intermediate-data buffer 503 and sends it to the storage 114. Image capturing is finished.

The display buffer 504 is used for displaying an indication, such as a finder, a reproduction, and a menu, by the display device 12 without interruption.

In the printing mode, as shown in FIG. 4B, the memory 110 includes a CPU area 511, a printing-data buffer 512, and a display buffer 513.

The CPU area 511 and the display buffer 513 are the same as the CPU area 501 and the display buffer 504 in the image-capturing mode. The display buffer 504 is used for displaying the printing state of the printer 200 and an image being printed.

The printing-data buffer 512 is used for printing processing.

It is clear from FIG. 4B that neither the CCD image buffer 502 nor the intermediate-data buffer 503 shown in FIG. 4A is required in the printing mode because the output of the CCD in the pickup system 103 does not need to be read and the processing in the development circuit 104 and the image compression circuit 105 does not need to be executed.

Therefore, the areas assigned to the CCD image buffer 502 and the intermediate-data buffer 503 are used as the printer buffer 512 in the printing mode.

As described above, since required memory allocation largely differs at least between the printing mode and the image-capturing mode, memory mapping in the memory 110 is switched according to an operation mode to allow a printing-processing function to be added efficiently without providing an additional memory.

As described above, the frequency of an internal clock is switched and memory allocation is also switched according to switching between the image-capturing mode and the printing mode. Therefore, the structure of the digital camera is made simple and its power consumption is reduced even when the digital camera executes printing processing.

Since especially the processing applied to an image captured by the camera,until it is stored in the memory is automatically performed by the special circuits, the load on the CPU is reduced. Since printing is performed according to a user's desired printing form in the printing processing, however, the processing relies on the CPU. Therefore, it is preferred that the clock frequency be switched to a high clock frequency.

With the above structure, since it is not necessary to continue to provide the high clock frequency, power consumption is reduced, and the most appropriate structure is provided for the camera which also executes the printing processing.

An operation mode, such as the image-capturing mode or the printing mode, is switched by the user at the mode switch 121. Operation-mode switching is not limited to this method. Various forms of mode switching are possible.

For example, mode switching may be performed on a menu screen. Alternatively, mode switching may be automatically performed by recognizing the connection or the disconnection of a cable, or the state of the printer 200.

It is needless to say that an object of the present invention is achieved by a form in which a storage medium which stores the program code of software that implements the functions of the host and the terminal in the above embodiment is sent to a system or an apparatus; and a computer (or CPU or MPU) of the system or the apparatus reads the program code stored in the storage medium and executes it.

In this case, the program code itself read from the storage medium implements the functions of the above embodiment. The storage medium storing the program code is a part of the present invention.

The storage medium for storing the program code can be a ROM, a floppy disk, a hard disk, an optical disk, a magneto-optical disk, a CD-ROM, a CD-R, a magnetic tape, or a non-volatile memory card.

It is needless to say that the present invention includes cases in which the functions of the above embodiment are implemented not only by executing program code read by the computer, but also by executing a process which is a part or all of actual processing by an operating system running on the computer, according to the instructions of the program code.

It is also needless to say that the present invention includes a case in which the program code read from the storage medium is written into a memory provided for a function extension board inserted into the computer or for a function extension unit connected to the computer, and a CPU or the like provided for the function extension board or the function extension unit executes a part or all of actual processing to implement the functions of the above embodiment.

As described above, in the present invention, an operating frequency (the operating frequency of a signal generated for control means controlling the operation of the entire image-capturing apparatus) used for controlling an image-capturing operation is changed according to an operation mode. Therefore, an image-capturing operation is performed at an operating frequency appropriate for an operation mode. Consequently, electric power required for controlling an image-capturing operation is suppressed.

More specifically, different operating frequencies (clock frequencies) are generated for control means (CPU or the like) between when printing processing is executed (in the printing mode) and when an image is taken by pickup means (in the image-capturing mode).

With this structure, for example, since a high operating frequency can be sent to the control means when printing processing is executed in the printing mode, and a low operating frequency can be sent in the image-capturing mode, electric power required for processing performed in the control means can be suppressed, and the printing processing can be executed within a short period.

Therefore, since power consumption is suppressed to the minimum level as a whole, a mounted battery can be made compact to suppress manufacturing cost to a low level. In addition, printing can be executed within a short period, if necessary.

When a high operating frequency is given to the control means if a connected printer (function) is appropriate and normal in the printing mode, since the high operating frequency is given to the control means only when a connected printer (function) is appropriate and normal, an operating frequency higher than necessary is not used, and therefore electric-power consumption is suppressed.

When means (such as image-capturing means including development means, image compression means, and image decompression means) that operates in the image-capturing mode is configured by hardware, even if the control means operates at a low operating frequency, image-capturing processing is performed at a high speed.

When different memory allocation is used in the storage means between the printing mode and the image-capturing mode, a sufficient buffer area is obtained for printing processing without providing an additional memory, and the printing processing is performed at a high speed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-capturing apparatus having a function for printing a captured image with the use of an external printer, comprising:
   image-capturing means for obtaining the captured image;
   control means for controlling the operation of the apparatus during an image-capturing processing and a printing processing;
   clock generating means for operating the control means, the clock generating means generating clock signals having different frequencies, as between when the printing processing is executed and when the image-capturing means is executed; and
   determining means for determining whether an operating state of the external printer is in a predetermined normal state for printing processing,
   wherein, in a case where the determining means determines that the external printer is in the normal state, the clock generating means changes a frequency to that of when the printing processing is executed.

2. An image-capturing apparatus according to claim 1, further comprising a display panel for displaying an error indication when the determining means determines that the external printer is not in the normal state.

3. An image-capturing apparatus according to claim 1, wherein the clock generating means gives a clock signal having a higher frequency in the printing processing than that in the image-capturing processing.

4. An image-capturing apparatus according to claim 1, wherein the clock generating means changes the frequency when the printing processing is terminated.

5. An image-capturing apparatus having a function for printing a captured image with the use of an external printer, comprising:
   image-capturing means for obtaining the captured image;
   mode switching means for switching between an image-capturing mode which is to execute the image-capturing processing by the image-capturing means and a printing mode which is to execute the printing processing;
   control means for controlling the operation of the apparatus, including the image-capturing processing and the printing processing;
   clock generating means for the control means, the clock generating means generating clock signals having different operating frequencies as between when the printing processing is executed and when the image-capturing processing is executed; and
   determining means for determining, after the mode switching means switches a mode to the printing mode, whether an operating state of the external printer is in a predetermined normal state for printing processing,
   wherein, in a case where the determining means determines that the external printer is in a normal state, the clock generating means changes a frequency to that of when the printing processing is executed.

6. An image-capturing apparatus according to claim 5, further comprising a display panel for displaying an error indication when the determining means determines that the external printer is not in the normal state.

7. An image-capturing apparatus according to claim 5, wherein the clock generating means gives a clock signal having a higher frequency in the printing processing than that in the image-capturing processing.

8. An image-capturing apparatus according to claim 5, wherein the clock generating means changes the frequency when the printing processing is terminated.

9. A control method for an image-capturing apparatus having image-capturing means for obtaining a captured image, control means for controlling the operation of the image-capturing apparatus comprising at least the image-capturing means and for executing a printing processing, and a function for printing the captured image by an external printer, comprising:
   a generating step of generating a clock signal having a predetermined frequency for the image-capturing means and for the control means;
   a determining step of determining whether an operating state of the external printer is in a predetermined normal state of printing processing; and
   a changing step of changing the frequency of the clock signal generated in the generating step to a frequency of when the printing process is executed in a case wherein it is determined in the determining step that the external printer is in the normal state.

10. A control method according to claim 9, further comprising a display controlling step of displaying an error indication on a display panel when the external printer is not in the normal state.

11. A control method according to claim 9, wherein the generating step changes the frequency of a generated clock signal when the printing processing is terminated.

12. A control method for an image-capturing apparatus having image-capturing means for obtaining a captured image, control means for controlling the operation of the image-capturing apparatus comprising at least the image-capturing means and for executing a printing processing, comprising:
   a determining step of determining whether the operation of the external printer is in the normal state for the printing processing or not,
   wherein a frequency of a clock signal supplied to the image-capturing means and to the control means is changed to that of when the printing processing is executed when the determining step determines that the external printer is in the normal state.

13. A control method according to claim 12, further comprising a display controlling step of displaying an error indication on a display panel when the external printer is not in the normal state.

14. A control method according to claim 12, wherein a generating step supplies the clock signal having a higher frequency in the printing mode than that in the image-capturing mode to the control means.

15. A control method for an image-capturing apparatus having image-capturing means for obtaining a captured image, control means for an image-capturing processing by the image-capturing means and a printing processing, and a function for printing the captured image by an external printer, comprising:

- a mode selecting step of selecting a mode between an image-capturing mode which is to execute the image-capturing processing and a printing mode which is to execute the printing processing;
- a generating step of generating a clock signal having a frequency for the control means according to the mode which is selected by the mode selecting step;
- a determining step of determining, after the mode is switched to the printing mode, whether an operating state of the external printer is in a predetermined normal state of printing processing, wherein, in a case wherein it is determined in the determining step that the external printer is in the normal state, the clock signal generated in the generating step is generated at a frequency of when the printing processing is executed, and wherein the generating step changes the frequency when the printing processing is terminated.

16. A control method according to claim 15, wherein the clock generating means gives the clock signal having a lower frequency when the printing processing is terminated.

* * * * *